United States Patent
Kim et al.

(10) Patent No.: US 11,656,963 B2
(45) Date of Patent: *May 23, 2023

(54) STORAGE DEVICE AND METHOD FOR OPERATING STORAGE DEVICE

(71) Applicant: Samsung Electronics Co., Ltd., Suwon-si (KR)

(72) Inventors: Yeon Woo Kim, Suwon-si (KR); Jea Young Kwon, Hwaseong-si (KR); Walter Jun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,451

(22) Filed: Feb. 24, 2022

(65) Prior Publication Data

US 2022/0269572 A1  Aug. 25, 2022

Related U.S. Application Data

(63) Continuation of application No. 16/507,170, filed on Jul. 10, 2019, now Pat. No. 11,281,549.

(30) Foreign Application Priority Data

Oct. 4, 2018 (KR) .......................... 10-2018-0118282

(51) Int. Cl.
*G06F 11/20* (2006.01)
*G06F 12/06* (2006.01)
*G06F 11/07* (2006.01)

(52) U.S. Cl.
CPC ...... *G06F 11/2094* (2013.01); *G06F 11/0793* (2013.01); *G06F 12/0646* (2013.01); *G06F 2201/82* (2013.01); *G06F 2212/1008* (2013.01)

(58) Field of Classification Search
CPC ............ G06F 11/0793; G06F 11/2094; G06F 12/0646
USPC ......................................... 714/6.1, 6.11, 6.13
See application file for complete search history.

(56) References Cited

U.S. PATENT DOCUMENTS

| | | | |
|---|---|---|---|
| 9,772,797 | B2 | 9/2017 | Tan |
| 10,725,677 | B2* | 7/2020 | Shechter ............... G06F 3/0656 |
| 2010/0250836 | A1 | 9/2010 | Sokolov et al. |
| 2011/0296088 | A1 | 12/2011 | Duzly et al. |
| 2013/0111298 | A1 | 5/2013 | Seroff et al. |

(Continued)

FOREIGN PATENT DOCUMENTS

| | | |
|---|---|---|
| CN | 107516547 A | 12/2017 |
| KR | 20030065223 A | 8/2003 |
| KR | 20180054394 A | 5/2018 |

OTHER PUBLICATIONS

Extended European Search Report dated Feb. 6, 2020 from the European Patent Office for corresponding European Patent Application No. 19201429.8.

(Continued)

*Primary Examiner* — Chae M Ko
(74) *Attorney, Agent, or Firm* — Muir Patent Law, PLLC

(57) ABSTRACT

A storage device includes an integrity checking module checking integrity of data stored in a first host memory buffer (HMB) address of an HMB in a host coupled to the storage device, and an HMB mapping module mapping, if the integrity checking module determines the data as corrupted, the first HMB address to a second address.

10 Claims, 13 Drawing Sheets

(56) References Cited

U.S. PATENT DOCUMENTS

| | | |
|---|---|---|
| 2015/0046670 A1 | 2/2015 | Kim et al. |
| 2015/0309886 A1 | 10/2015 | Tsai et al. |
| 2017/0206030 A1 | 7/2017 | Woo et al. |
| 2017/0300246 A1 | 10/2017 | Michaeli |
| 2018/0039541 A1* | 2/2018 | Hahn .................. G06F 3/065 |
| 2018/0107417 A1 | 4/2018 | Shechter et al. |
| 2018/0181476 A1 | 6/2018 | Gunnam |
| 2020/0133566 A1 | 4/2020 | Kim et al. |

OTHER PUBLICATIONS

First Office Action dated Feb. 21, 2023 by the Intellectual Property Office of Singapore for corresponding patent application SG 10201907973Q.

* cited by examiner

STORAGE DEVICE AND METHOD FOR OPERATING STORAGE DEVICE

CROSS-REFERENCE TO RELATED APPLICATION

This application is a continuation of U.S. patent application Ser. No. 16/507,170 filed on Jul. 10, 2019, which claims priority under 35 U.S.C. 119 to Korean Patent Application No. 10-2018-0118282, filed on Oct. 4, 2018 in the Korean Intellectual Property Office, the disclosure of each of which is incorporated herein in its entirety by reference.

BACKGROUND

1. Field of the Disclosure

The present disclosure relates to a storage device and a method of operating the storage device.

2. Description of the Related Art

Storage devices including a non-volatile memory, such as flash memory, may store data in a memory of a host, for example, a DRAM (Dynamic Random Access Memory) provided in the host, if necessary. For example, if a buffer memory in the storage device is not sufficient, the storage device may access the memory of the host as a host memory buffer (hereinafter 'HMB').

Generally, when the data stored in the HMB is corrupted, the storage device executes a recovery operation on the data. If the cause of data corruption is, for example, an error on data transmission between the storage device and the host or an error in the process of writing data on the HMB, the data corruption may be recovered with execution of one-time recovery.

However, in a case where a cause of data corruption exists in the host memory itself that provides the HMB, for example, the data corruption may occur repeatedly. The cause of the data corruption may include a hardware failure of DRAM such as a bit flip. Unlike the error on the data transmission, it is difficult to fundamentally solve the problem of data corruption at that location.

BRIEF DESCRIPTION OF THE DRAWINGS

The above and other aspects and features of the present disclosure will become more apparent by describing in detail example embodiments thereof with reference to the attached drawings, in which.

SUMMARY

Aspects of the present disclosure provide a storage device capable of preventing a recovery overhead and recovering data corruption, when the data stored in the HMB is corrupted due to a hardware failure of a host memory.

Aspects of the present disclosure also provide a method for operating the storage device capable of preventing a recovery overhead and recovering data corruption, when the data stored in the HMB is corrupted due to a hardware failure of a host memory.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an exemplary embodiment of the present inventive concept, a storage device includes an integrity checking module checking integrity of data stored in a first host memory buffer (HMB) address of an HMB in a host coupled to the storage device, and an HMB mapping module mapping, if the integrity checking module determines the data as corrupted, the first HMB address to a second address.

According to an exemplary embodiment of the present inventive concept, a storage device includes an internal memory, an integrity checking module checking integrity of data stored in a first host memory buffer (HMB) address of an HMB in a host coupled to the storage device, and an HMB mapping module mapping, if the data is determined as corrupted by the integrity checking module, the first HMB address to a second HMB address in the HMB different from the first HMB address in a first operation mode and to an internal memory address of the internal memory in a second operation mode different from the first operation mode.

According to an exemplary embodiment of the present inventive concept, a storage device includes an integrity checking module checking integrity of data stored in a first HMB address of a host memory buffer (HMB) in a host coupled to the storage device, a hardware-error-determination module comparing the number of times that the data stored in the first HMB address is determined as corrupted, with a predetermined threshold value, and an HMB mapping module storing, depending on a comparing result of the hardware-error-determination module, an entry of address mapping from the first HMB address to a second HMB address in the HMB different from the first HMB address in a mapping table.

According to an exemplary embodiment of the present inventive concept, a method of operating a storage device is provided as follows. Integrity of data is checked that is stored in a first host memory buffer (HMB) address of an HMB in a host coupled to the storage device. The first HMB address is mapped to a second address if the data is determined as corrupted as a result of the checking of the integrity of the data.

DETAILED DESCRIPTION

Figure 1:
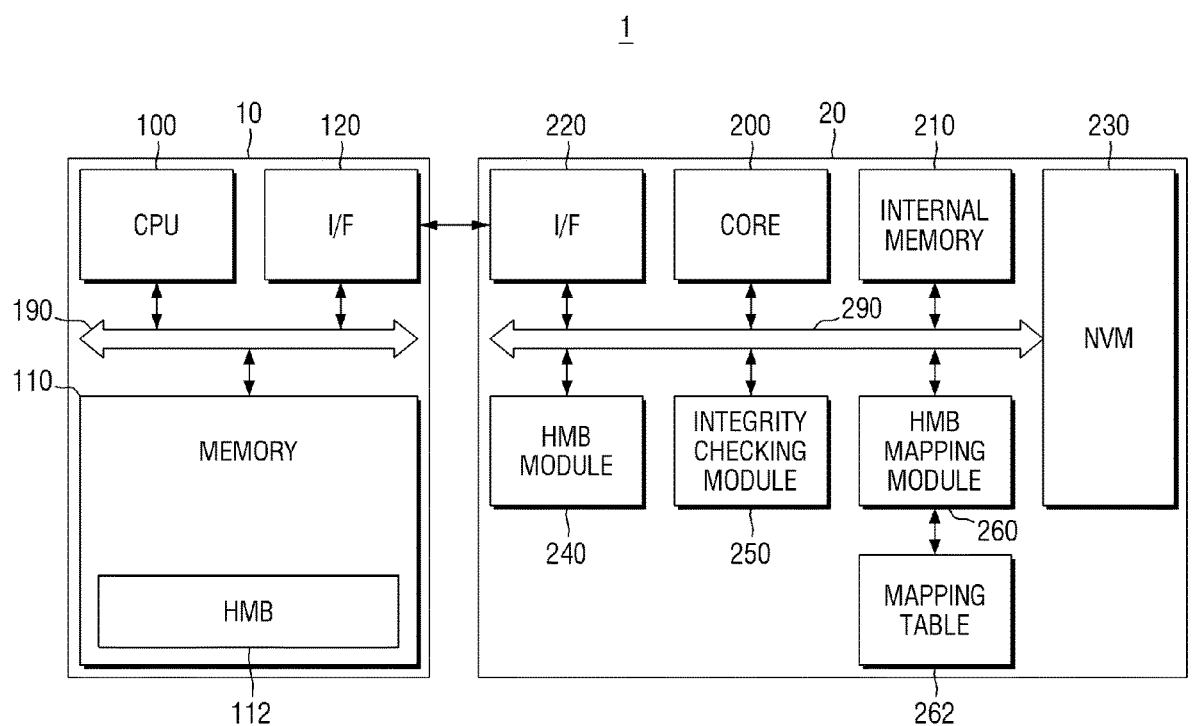
FIG. 1 is a schematic diagram illustrating a storage system according to an embodiment of the present disclosure.

FIG. 1 is a schematic diagram illustrating a storage system according to an embodiment of the present disclosure.

Referring to FIG. 1, a storage system 1 according to an embodiment of the present disclosure includes a host 10 and a storage device 20.

In some embodiments of the present disclosure, the host 10 and the storage device 20 may be connected to each other via an electric interface, such as a UFS (Universal Flash Storage), an SCSI (Small Computer System Interface), an SAS (Serial Attached SCSI), an SATA (Serial Advanced Technology Attachment) a PCIe (Peripheral Component Interconnect Express), an eMMC (embedded MultiMedia-Card), a FC (Fiber Channel), an ATA (Advanced Technology Attachment), an IDE (Integrated Drive Electronics), a USB (Universal Serial Bus), and an IEEE 1394 (Firewire). However, the scope of the present disclosure is not limited thereto, and may be applied to any interface which allows data to be transmitted and received between the host 10 and the storage device 20.

The host 10 includes a CPU (Central Processing Unit) 100, a memory 110, and an interface 120. The CPU 100, the memory 110, and the interface 120 may transmit and receive the data each other via a bus 190.

The CPU 100 may drive an application or a driver. The application may be executed by the host 10 and may control the storage system 1, and the driver may drive the storage device 20 electrically connected to the host 10. Specifically, the driver may receive a command for controlling the storage device 20 from the application, and the storage device 20 may provide the result of processing the command to the application.

The memory 110 may be used as a main memory of the host 10, or may be used as a cache memory, a temporary memory, or the like for temporarily storing the data. In some embodiments of the present disclosure, the memory 110 may include volatile memory, including a DRAM (Dynamic Random Access Memory), but the scope of the present disclosure is not limited thereto.

The interface 120 of the host 10 may be electrically connected with the interface 220 of the storage device 20 to transmit and receive commands or data. Meanwhile, although not illustrated, the interface 120 of the host 10 may also provide a reference clock that may be used for operation of the interface 220 of the storage device 20.

The memory 110 of the host 10 includes an HMB 112. The HMB 112 is a partial region on the memory 110 that is set so that the storage device 20 may access from the host 10. For example, the storage device 20 may access the HMB 112 within the memory 110 attached to the CPU 100. The host 10 may set a buffer address, a buffer size and the like to which the storage device 20 may access, on the memory 110. For example, the host 10 may set an HMB address, an HMB size and the like for the HMB 112 which the storage device 20 may be allowed to access.

Then, the storage device 20 may read data from the non-volatile memory 230 and write the data on the HMB 112 of the host 10. In this case, the same data may be stored in both the HMB 112 and the non-volatile memory 230. Further, the storage device 20 may read data from the HMB 112 of the host 10 other than the non-volatile memory 230 when it is necessary to refer to the data. On the other hand, for example, when the value of the data stored in the non-volatile memory 230 is updated, the storage device 20 may update the data stored in the HMB 112 of the host 10, and moreover, the storage device 20 may also flush data in the HMB 112 to the non-volatile memory 230.

Integrity of data stored in the HMB 112 should be guaranteed. If the data stored in the HMB 112 is corrupted, the corrupted data should be recovered through, for example, a recovery execution or a recovery operation. However, if the HMB 112 itself has a hardware error and data is stored in a location with the error, continuous data corruption occurs. More specifically, every time data is read from that location with the hardware error in the HMB 112 that is not repaired, data corruption continuously occurs, and a recovery operation is repeatedly performed on the data corruption. The location with the hardware error in the HMB 112 may correspond to a single-bit memory cell of the HMB 112 which has permanent failure which may occur while the HMB 112 is in use. For the location with the hardware error, the data corruption will be continued and the data recovery operation will be repeated.

The storage device 20 according to an embodiment of the present disclosure for addressing this issue will be described.

The storage device 20 includes a core 200, an internal memory 210, an interface 220, a non-volatile memory 230, an HMB module 240, an integrity checking module 250 and an HMB mapping module 260.

The core 200 generally controls the storage device 20, and like the memory 110 of the host 10, the internal memory 210 may be used as a main memory of the storage device 20 or may be used as a cache memory, a temporary memory or the like for temporarily storing data. The non-volatile memory 230 may include a flash memory, an MRAM (Magnetoresistive Random Access Memory), a PRAM (Phase-change Random Access Memory), a FeRAM (Ferroelectric Random Access Memory) and the like, but the scope of the present disclosure is not limited thereto.

The HMB module 240 may execute basic operations for accessing the HMB 112 of the host 10. For example, the HMB module 240 may execute operations, such as reading data from the non-volatile memory 230 and writing the data on the HMB 112 of the host 10, or reading data from the HMB 112 of the host 10 other than the non-volatile memory 230 and providing the data to the core 200. Further, the HMB module 240 may execute operations, such as updating data stored in the HMB 112 of the host 10 or flushing data stored in the HMB 112 to the non-volatile memory 230, when the data value is updated.

The integrity checking module 250 checks the integrity of data stored in a first HMB address of the HMB 112 in the host 10.

Specifically, when data are written on the HMB 112, the integrity checking module 250 may generate checking data for checking the integrity of the data. The HMB module 240 may write the data and the checking data together on the HMB 112. The present invention is not limited thereto. For example, if the HMB module 240 and the integrity checking module 250 are integrated into an integrity checking module 250 of FIG. 10, the integrity checking module 250 of FIG. 10 may write the data and the checking data together on the HMB 112. Further, when data are read from the HMB 112, the HMB module 240 may read checking data for checking the integrity of the data from the HMB 112, and the integrity checking module 250 may check the integrity of the data using the checking data. The present invention is not limited thereto. For example, if the HMB module 240 and the integrity checking module 250 are integrated into an integrity checking module 250 of FIG. 10, the integrity checking module 250 of FIG. 10 may read the data and the checking data together from the HMB 112 and check the integrity of the data using the checking data.

In other embodiment of the present disclosure, data may be stored in the HMB 112, and checking data for checking the integrity of the data may be stored in the storage device 20 (for example, the internal memory 210). In this case, the HMB module 240 may write the data on the HMB 112 and write the checking data for checking the integrity of the data, for example, on the internal memory 210. Further, the HMB module 240 may read data from the HMB 112 and read checking data for checking the integrity of the data from the internal memory 210 of the storage device 20, and the integrity checking module 250 may check the integrity of the data using the checking data. Those skilled in the art should be familiar with the uses of the HMB module 240 and the integrity checking module 250 in processing environments generally, more specifically, in storage devices communicating with other devices. Each of the HMB module 240 and the integrity checking module 250 may be implemented in software, firmware, hardware, or some suitable combination of at least two of the three.

The HMB mapping module 260 maps the first HMB address to the other address, on the basis of the checking result of the integrity checking module 250, when the data is corrupted. Further, the HMB mapping module 260 may manage information on the first HMB address and the other address, using a mapping table 262. For example, the HMB mapping module 260 may manage the mapping table 262 storing information on address mapping from the first HMB address to the other address. In an example embodiment, the mapping table 262 may be integrated into the HMB mapping module 260. For example, the HMB mapping module 260 may include a memory to store the information of the mapping table 262.

For example, the HMB mapping module 260 may map the first HMB address to a second HMB address in the HMB 112 different from the first HMB address, when the data is corrupted. The HMB mapping module 260 may manage information on the first HMB address and the second HMB address, using the mapping table 262. For example, the HMB mapping module 260 may manage the mapping table 262 storing information on an address mapping from the first HMB address to the second HMB address. In an example embodiment, the HMB mapping module 260 may be implemented in software, firmware, hardware, or some suitable combination of at least two of the three. The operation of the HMB mapping module 260 will be described in detail with reference to FIGS. 2 to 6.

In this way, if a location of the first HMB address in the HMB 112 has a hardware error, the first HMB address is mapped to the other address so that data is prevented from being stored at that location. Thus, it is possible to repair data corruption without the recovery overhead caused by occurrence of the repetitive recovery operation.

Figure 2:
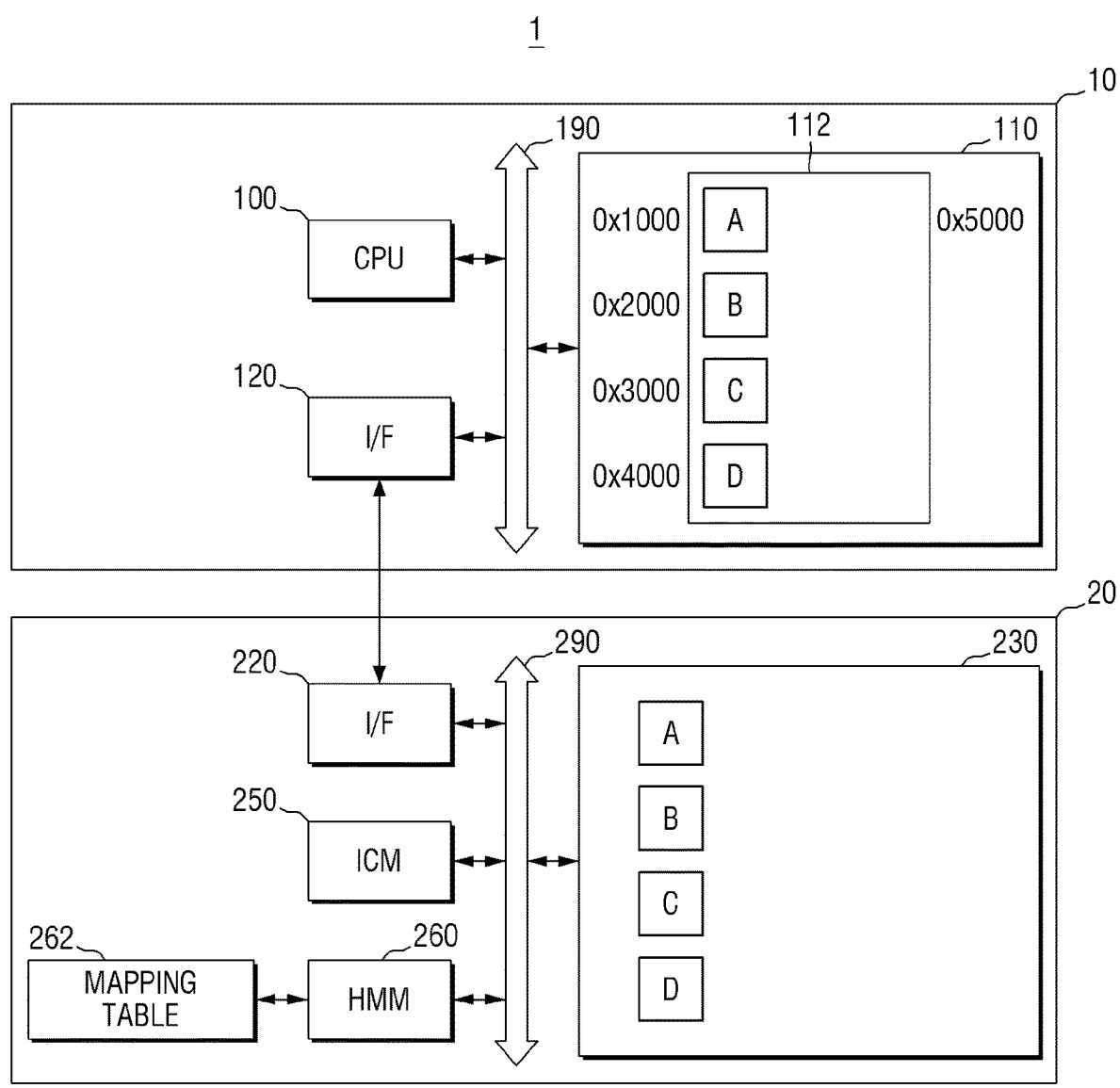
FIG. 2 is a block diagram illustrating the storage system of FIG. 1.

FIG. 2 is a block diagram illustrating the storage system of FIG. 1.

Referring to FIG. 2, data (A to D) are stored in the HMB 112 of the host 10. The data (A to D) stored in the HMB 112 correspond to the data copied from the data (A to D) stored in the non-volatile memory 230 of the storage device 20.

In this embodiment, each of the data (A to D) may have an arbitrary size. For example, the data (A) may be accessed by the HMB address 0x1000 and may have a first size, and the data (B) may be accessed by the HMB address 0x2000 and may have a second size. For example, the HMB address 0x1000 may be a starting address of the data (A) with the first size, and the HMB address 0x2000 may be a starting address of the data (B) with the second size. Further, the data (C) may be accessed by the HMB address 0x3000 and may have a third size, and the data (D) may be accessed by the HMB address 0x4000 and may have a fourth size. For example, the HMB address 0x3000 may be a starting address of the data (C) with the third size, and the HMB address 0x4000 may be a starting address of the data (D) with the fourth size. Here, the first size to the fourth size may all be the same, and may not be the same.

On the other hand, in the present embodiment, each of the data (A to D) stored in the HMB 112 may also include checking data for checking integrity of the data other than the data (A to D) stored in the non-volatile memory 230. In some embodiments of the present disclosure, the checking data may include data for a CRC (cyclical redundancy check), a hash value, and the like, but the scope of the present disclosure is not limited thereto.

For example, the storage device 20 may read at least one of the data (A to D) from the non-volatile memory 230 and write it on the HMB 112 of the host 10. Further, the storage device 20 may read at least one of the data (A to D) from the HMB 112 of the host 10 other than the non-volatile memory 230.

In this case, the integrity checking module 250 may, for example, check the integrity of the data (A) stored at the HMB address 0x1000. Specifically, when the data (A) is written on the HMB 112, the integrity checking module 250 may generate checking data for checking integrity of the data (A), and the HMB module 240 may write the checking data together with the data (A) on the location accessed by HMB address 0x1000 of the HMB 112. Further, when the data (A) is read from the HMB 112, the HMB module 240 may read the data (A) and the checking data, and the integrity checking module 250 may check the integrity of the data (A) using the checking data.

In the present embodiment, for convenience of explanation, it has been described that the checking data is stored in the HMB 112 together with the data (A to D), but the scope of the present disclosure is not limited thereto. As described above with reference to FIG. 1, the checking data may be stored inside the storage device 20 separately from the data (A to D).

Figure 3:
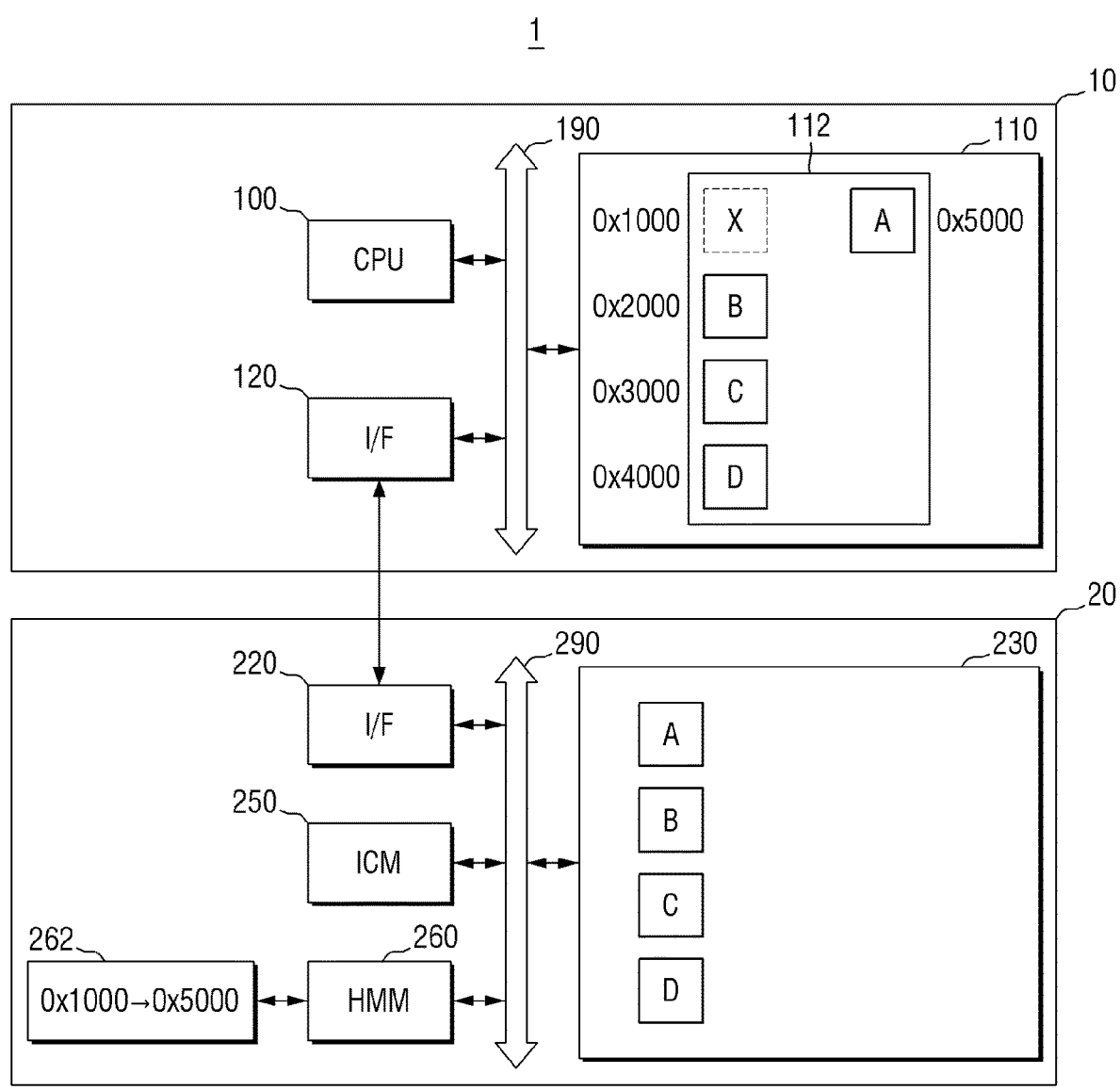
FIG. 3 is a block diagram illustrating one operation example of the storage system of FIG. 1.

FIG. 3 is a block diagram illustrating one operation example of the storage system of FIG. 1.

Referring to FIG. 3, the HMB mapping module 260 may map 0x1000 corresponding to the first HMB address to the other address, for example, the HMB address 0x5000, on the basis of the checking result of the integrity checking module 250, when the data (A) is corrupted. Further, the HMB mapping module 260 may insert an entry of address mapping from 0x1000 corresponding to the first HMB address to 0x5000 corresponding to the other address into the mapping table 262.

Thereafter, for example, when it is necessary to access the HMB 112 of the host 10 according to the request of the core 200, the HMB mapping module 260 may receive the first HMB address 0x1000 and provide the other address 0x5000 for the access. In this manner, the location accessed with the first HMB address 0x1000 may be replaced with another location accessed with the other address 0x5000 for the access.

In this way, mapping the first HMB address 0x1000 at which data corruption occurs to the other address 0x5000 may prevent data from being stored at a location accessed by the first HMB address 0x1000, and thus it is possible to recover the data corruption without the recovery overhead caused by occurrence of the repetitive recovery operation.

In some embodiments of the present disclosure, the corrupted data may be recovered to the location accessed by the other address, using the data stored in the non-volatile memory 230. For example, corrupted data (A) may be recovered to a location accessed by a second HMB address 0x5000, using data (A) stored in the non-volatile memory 230. In this case, when the location of the first HMB address 0x1000 is corrupted, the corrupted data may be recovered by copying data (A) stored in the non-volatile memory 230 to a location of the second HMB address 0x5000. When the storage device 20 accesses the location of the first HMB address 0x1000, the HMB mapping module 260 may generate the second HMB address 0x5000 from the first HMB address 0x1000, for example, and the storage device 20 may access the location of the second HMB address 0x5000 instead of the first HMB address 0x1000.

Alternatively, in some embodiments of the present disclosure, corrupted data may be recovered to a location accessed by the other HMB address after the recovery thereof is executed. For example, the corrupted data (A) of the first HMB address 0x1000 may be recovered to a location accessed by the second HMB address 0x5000 after the recovery thereof is executed.

Figure 4:
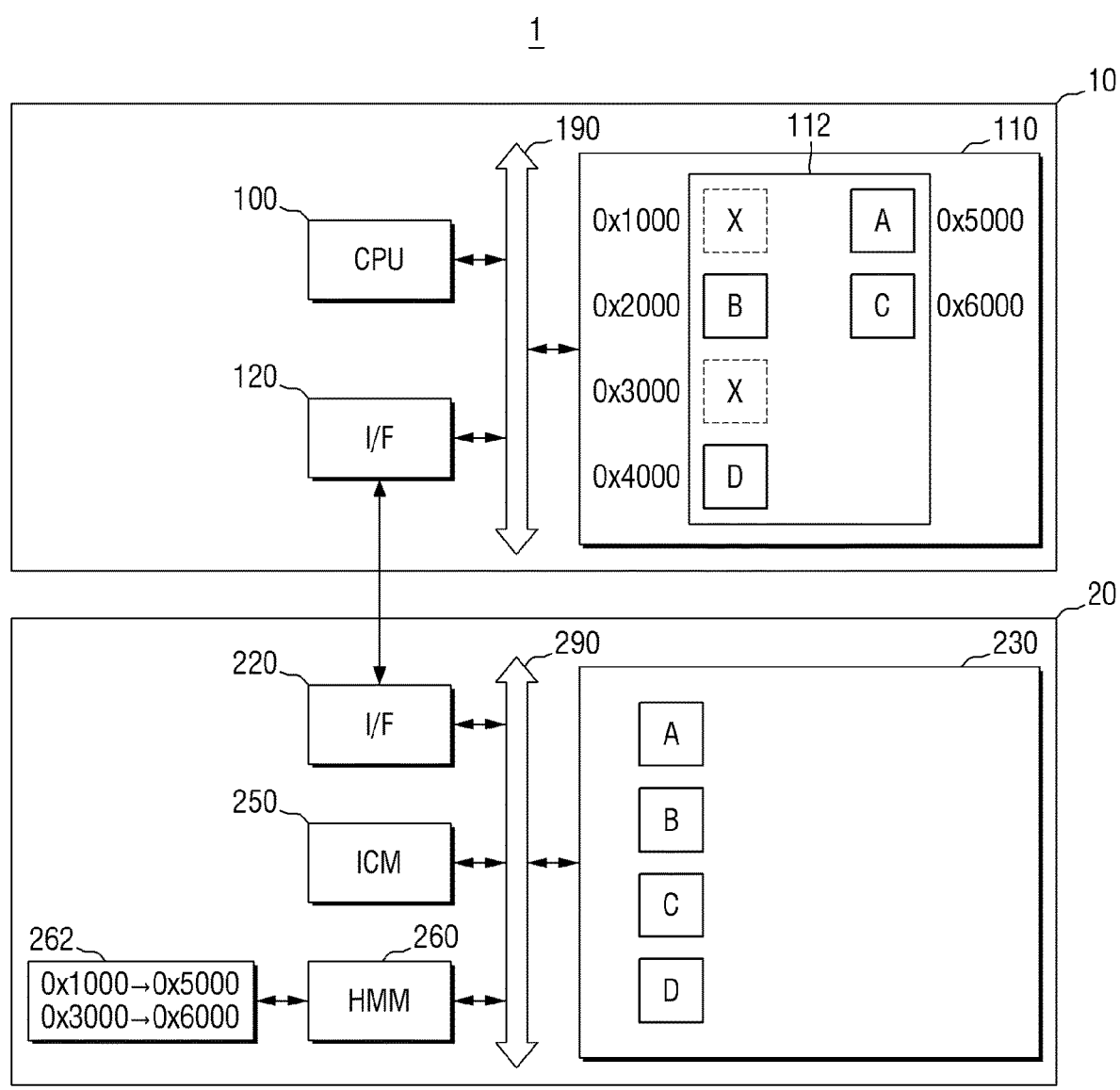
FIG. 4 is a block diagram illustrating one operation example of the storage system of FIG. 1.

FIG. 4 is a block diagram illustrating one operation example of the storage system of FIG. 1.

Referring to FIG. 4, the HMB mapping module 260 may map 0x3000 corresponding to a third HMB address to the other address, for example, a fourth HMB address 0x6000, on the basis of the checking result of the integrity checking module 250, when the data (C) is corrupted. Further, the HMB mapping module 260 may insert an entry of address mapping from the third HMB address 0x3000 to the fourth HMB address 0x6000 into the mapping table 262.

Thereafter, for example, when it is necessary to access the HMB 112 of the host 10 according to the request of the core 200, the HMB mapping module 260 may generate the fourth HMB address 0x6000 in response to the third HMB address 0x3000 for the access.

In this way, mapping the third HMB address 0x3000 at which data corruption occurs to the fourth address 0x6000 may prevent data from being stored in the location accessed by the third HMB address 0x3000, and thus it is possible to recover data corruption without the recovery overhead caused by occurrence of the repetitive recovery operation.

In the present embodiment, the corrupted data (C) of the third HMB address 0x3000 may be restored to a location accessed by the fourth HMB address 0x6000, using the data (C) stored in the non-volatile memory 230. For example, when the location of the third HMB address 0x3000 is corrupted, the corrupted data may be recovered by copying data (C) stored in the non-volatile memory 230 to a location of the fourth HMB address 0x6000. Alternatively, the corrupted data (C) may be recovered to a location accessed by the other address 0x6000 after the recovery thereof is executed.

Figure 5:
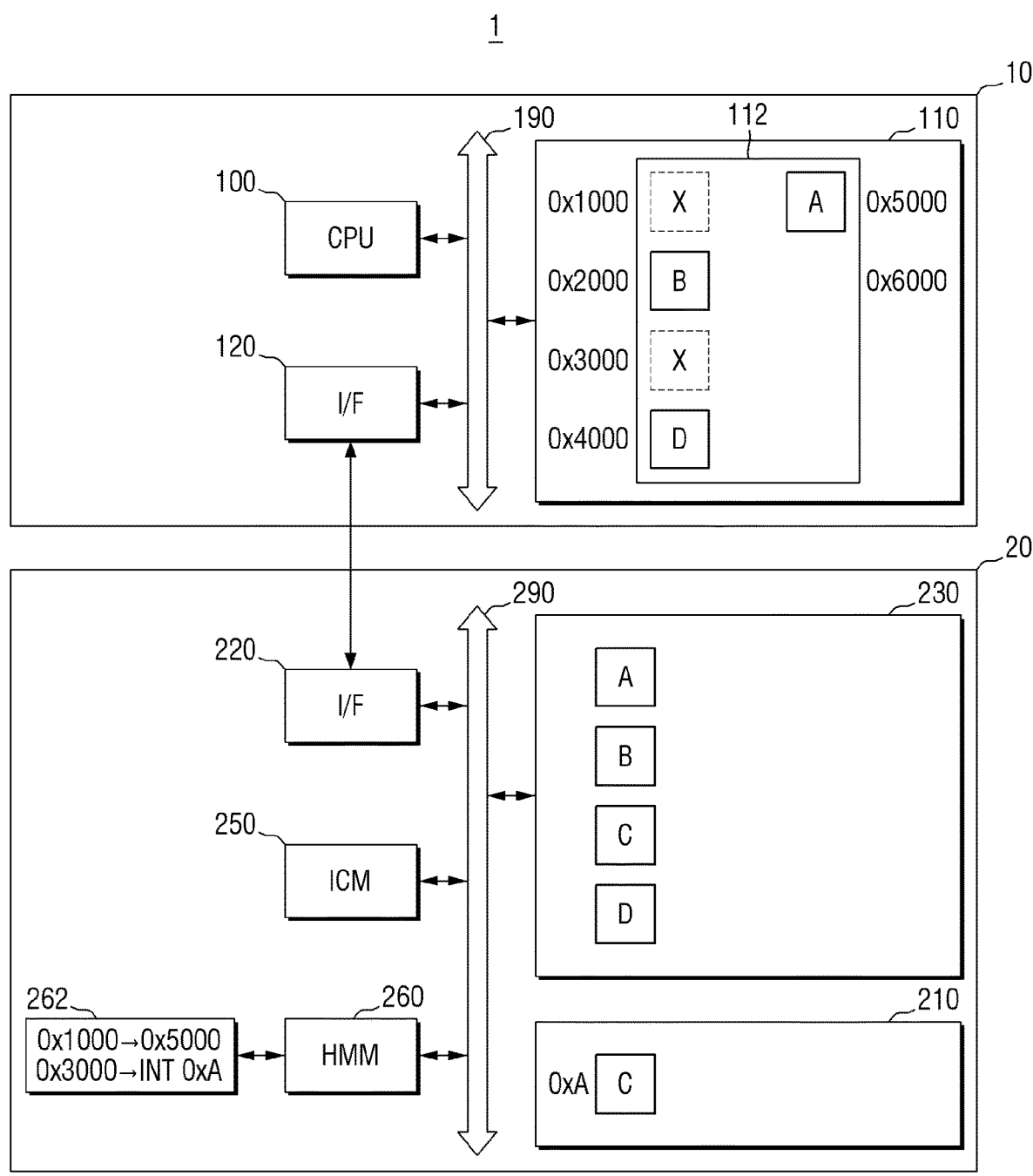
FIG. 5 is a block diagram illustrating one operation example of the storage system of FIG. 1.

FIG. 5 is a block diagram illustrating one operation example of the storage system of FIG. 1.

Referring to FIG. 5, unlike the embodiment of FIG. 4, the HMB mapping module 260 may map 0x3000 corresponding to the third HMB address to an internal memory address of the internal memory 210, for example, 0xA, on the basis of the checking result of the integrity checking module 250, when the data (C) is corrupted. Further, the HMB mapping module 260 may insert an entry of address mapping from 0x3000 corresponding to the third HMB address to 0xA corresponding to the internal memory address into the mapping table 262.

Thereafter, for example, when it is necessary to access the HMB 112 of the host 10 according to the request of the core 200, the HMB mapping module 260 may generate the internal memory Address 0xA in response to the third HMB address 0x3000 for the above access.

Execution of mapping to an internal memory address of the internal memory 210 as in the present embodiment may be executed in the following cases. As an example, if an available region accessible by the other address is not present in the HMB 112 (that is, when the HMB 112 is in a full state), the HMB mapping module 260 may map the first HMB address to the internal memory address of the internal memory 210.

As other example, the target of the mapping operation may be different depending on the operation mode determined by the storage device 20. Specifically, in a first operation mode, the HMB mapping module 260 may map a first HMB address to a second HMB address in the HMB 112. In a second operation mode, the HMB mapping module 260 may map a first HMB address to an internal memory address of the internal memory 210. In such a case, the first operation mode and the second operation mode may be arbitrarily set depending on the settings of the user or the operating policy of the storage system.

In the present embodiment, the corrupted data (C) of the third HMB address 0x3000 may be restored in a location accessed by the internal memory address 0xA, using the data (C) stored in the non-volatile memory 230. For example, when the location of the third HMB address 0x3000 is corrupted, the corrupted data may be recovered by copying data (C) stored in the non-volatile memory 230 to a location of the internal memory address 0xA. Or, the corrupted data (C) may be restored in the location accessed by the internal memory address 0xA after the recovery thereof is executed.

Figure 6:
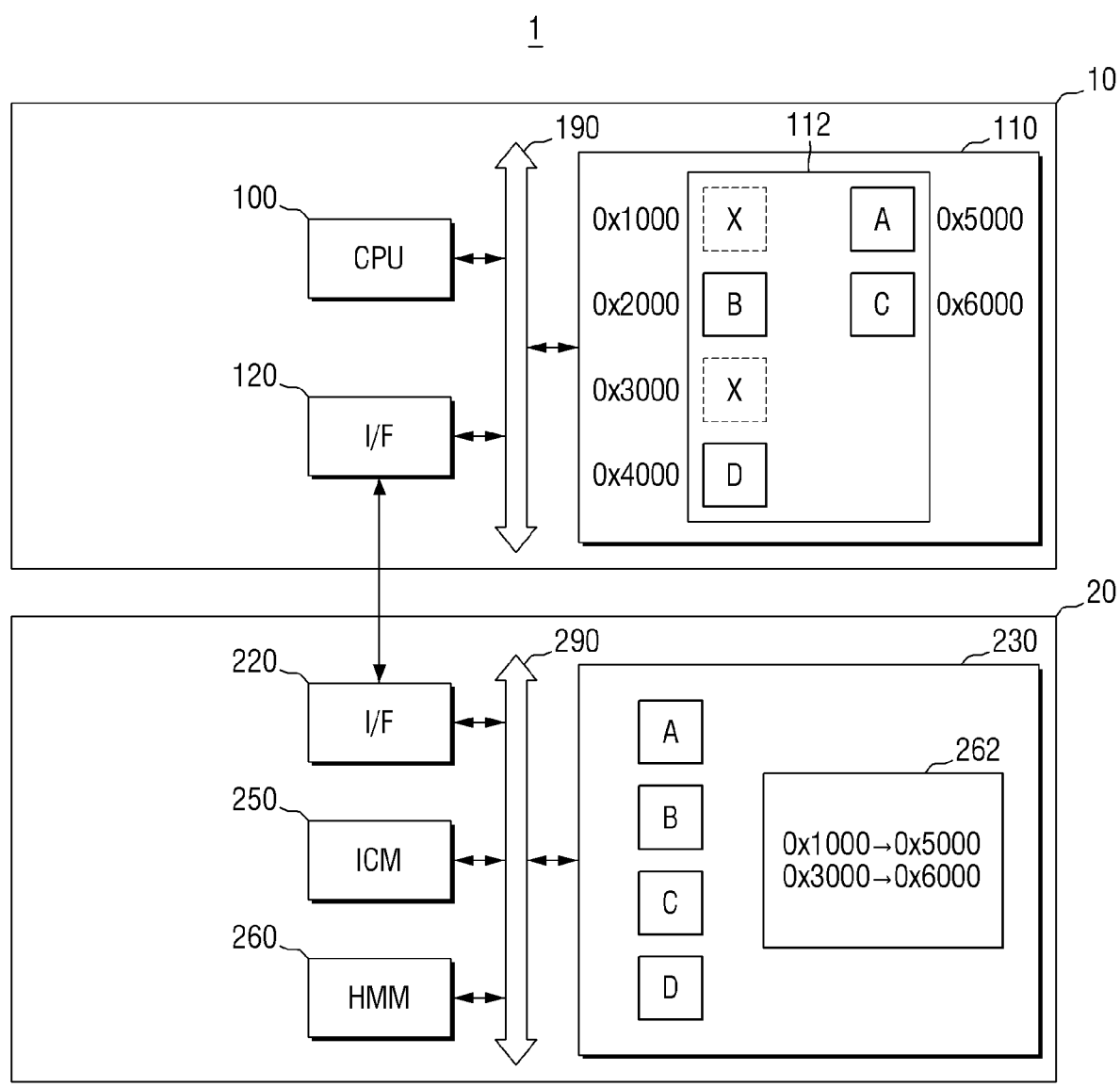
FIG. 6 is a block diagram illustrating one operation example of the storage system of FIG. 1.

FIG. 6 is a block diagram illustrating one operation example of the storage system of FIG. 1.

Referring to FIG. 6, the mapping table 262 may be stored in the non-volatile memory 230. Further, for example, when the storage device 20 is rebooted, the HMB mapping module 260 may acquire information on the first HMB address and the other addresses, using the mapping table 262 stored in the non-volatile memory 230.

On the other hand, the HMB mapping module 260 may also initialize information on the first HMB address and the other address stored in the mapping table 262.

According to the present embodiment, even when the storage device 20 is rebooted, it is possible to quickly recognize the location of the hardware defect on the HMB 112 of the host 10. For example, when the memory 110 of the host 10 is exchanged, since information on the address mapping may be quickly initialized, the performance of the storage device 20 may be further improved.

Figure 7:
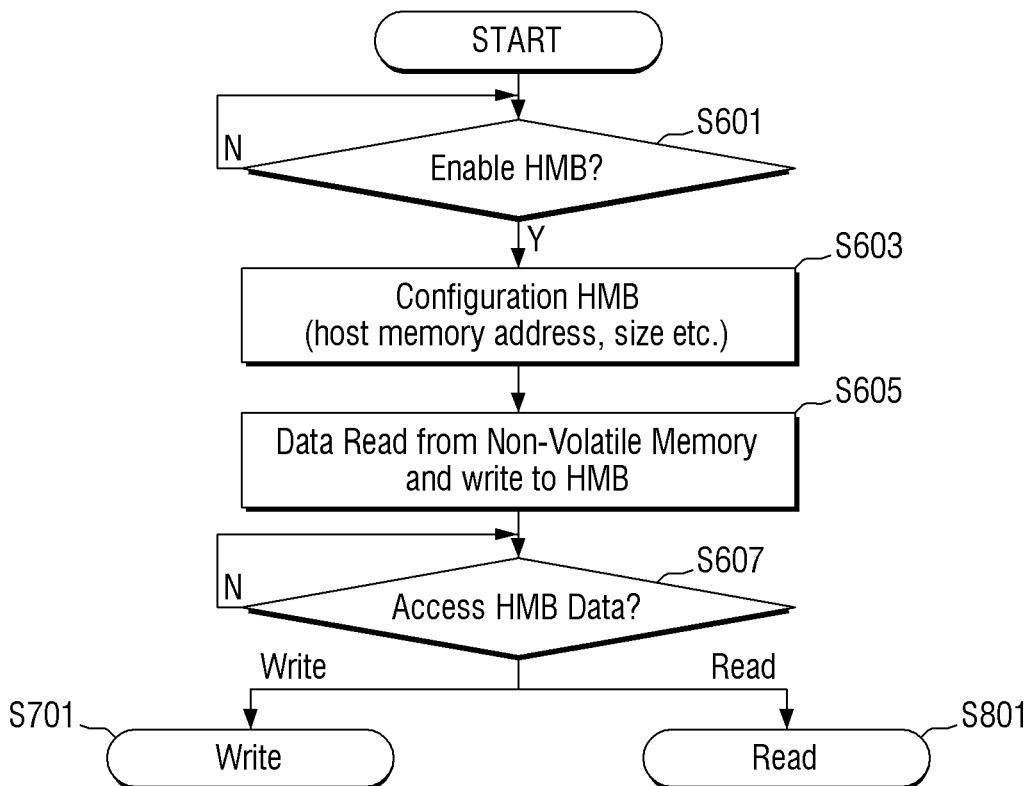
FIGS. 7 to 9 are flowcharts illustrating a method for operation the storage system of FIG. 1.
Figure 8:
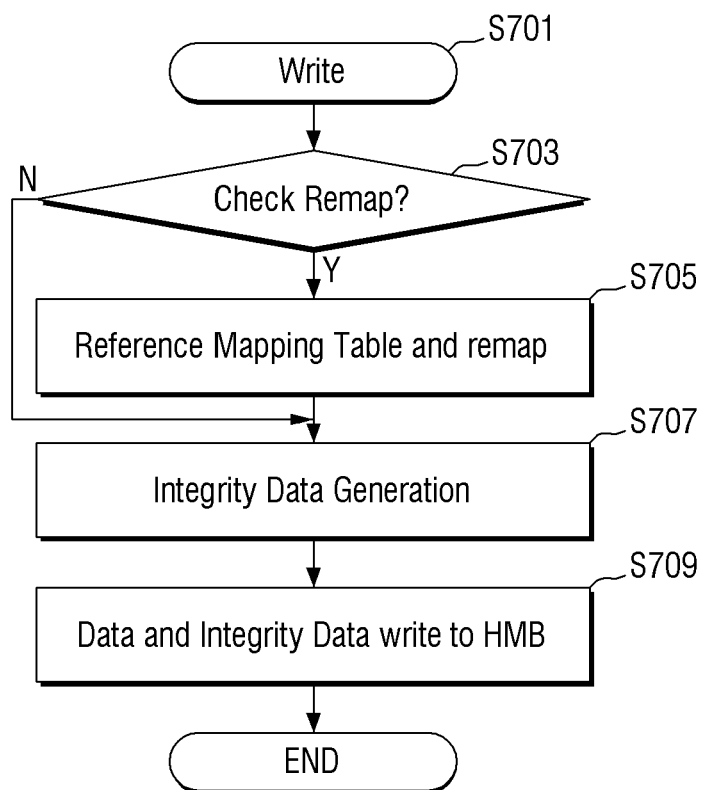
Figure 9:
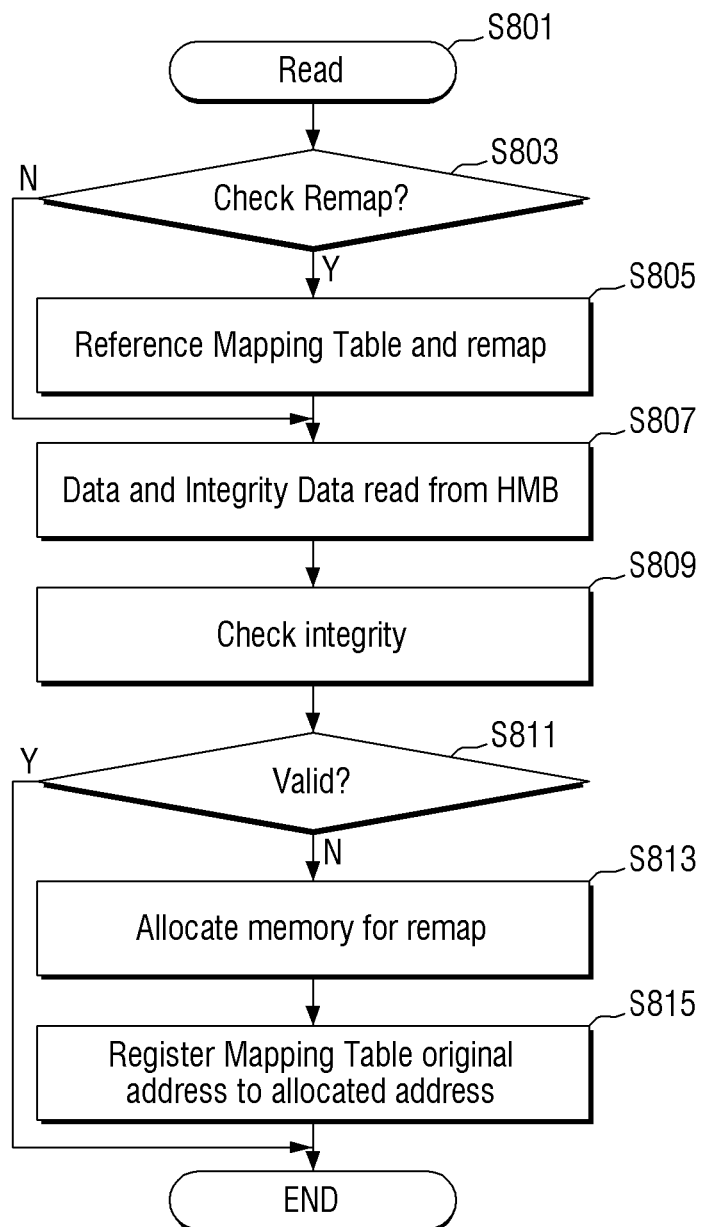

FIGS. 7 to 9 are flowcharts illustrating the method of operating the storage system of FIG. 1. The description of FIGS. 7 to 9 will also be made with further reference to FIG. 1.

Referring to FIG. 7, the storage system 1 of FIG. 1 determines whether an HMB operation mode is enabled (S601). When the HMB operation mode is enabled (S601, Y), the host 10 sets the HMB address (i.e., a buffer address) accessible by the storage device 20, the HMB size (i.e., a buffer size) and the like on the memory 110 (S603). Further, the storage device 20 reads data from the non-volatile memory 230 and writes the data on the HMB 112 (S605).

Next, it is determined whether it is necessary to access the HMB data (S607). For example, when it is necessary to access the HMB 112 by the request of the core 200 of the storage device 20 (S607, Y), the storage device 20 may write the data on the HMB 112 (S701) or may read data from the HMB 112 (S801).

Subsequently, referring to FIG. 8, when the storage device 20 writes data on the HMB 112 (S701), it is checked whether mapping is executed (S703). For example, the storage device 20 may perform a search of the mapping table 262 to determine whether to map the HMB address attempting to access the data.

When the mapping of the HMB address attempting to access the data is executed (S703, Y), the storage device 20 may refer to the mapping table 262 to acquire the address attempting to access the HMB 112 (S705).

Next, checking data for checking the integrity of the data is generated (S707), and the checking data may be written on the HMB 112 together with the data to be written (S709).

As described above, the checking data may be stored inside the storage device 20 separately from the data to be written.

Next, referring to FIG. 9, when the storage device 20 reads data from an HMB address of the HMB 112 (S801), it is checked whether mapping is executed on the HMB address (S803). For example, the storage device 20 may execute a search of the mapping table 262 to determine whether to map the HMB address attempting to access the data. When the mapping table 262 includes an entry for the HMB address, the address associated with the HMB address is read from the mapping table 262 and the storage device 20 reads data from a location of the address associated with the HMB address. The location may be in the HMB 112 or in the internal memory 210.

When mapping of the HMB address attempting to access the data is executed (S803, Y), the storage device 20 may refer to the mapping table 262 to acquire an address to access the HMB 112 (S805).

Next, the data and the checking data for checking the integrity of the data are read together from the HMB 112 (S807), and the integrity of the data may be checked using the checking data (S809).

If the checking data is stored in the internal memory 210 inside the storage device 20 other than the HMB 112, the above step (S807) may include reading the data from the HMB and reading the checking data from the internal memory 210.

When the data is not valid as a result of checking (S811, N), the storage device 20 allocates a memory for mapping to the HMB 112 (S813), and registers the existing address and the assigned address in the mapping table 262 (S815).

In this way, if a location of the first HMB address in the HMB 112 has a hardware error, the first HMB address is mapped to the other address so that data is prevented from being stored at that location. Thus, it is possible to repair data corruption without the recovery overhead caused by occurrence of the repetitive recovery operation.

Figure 10:
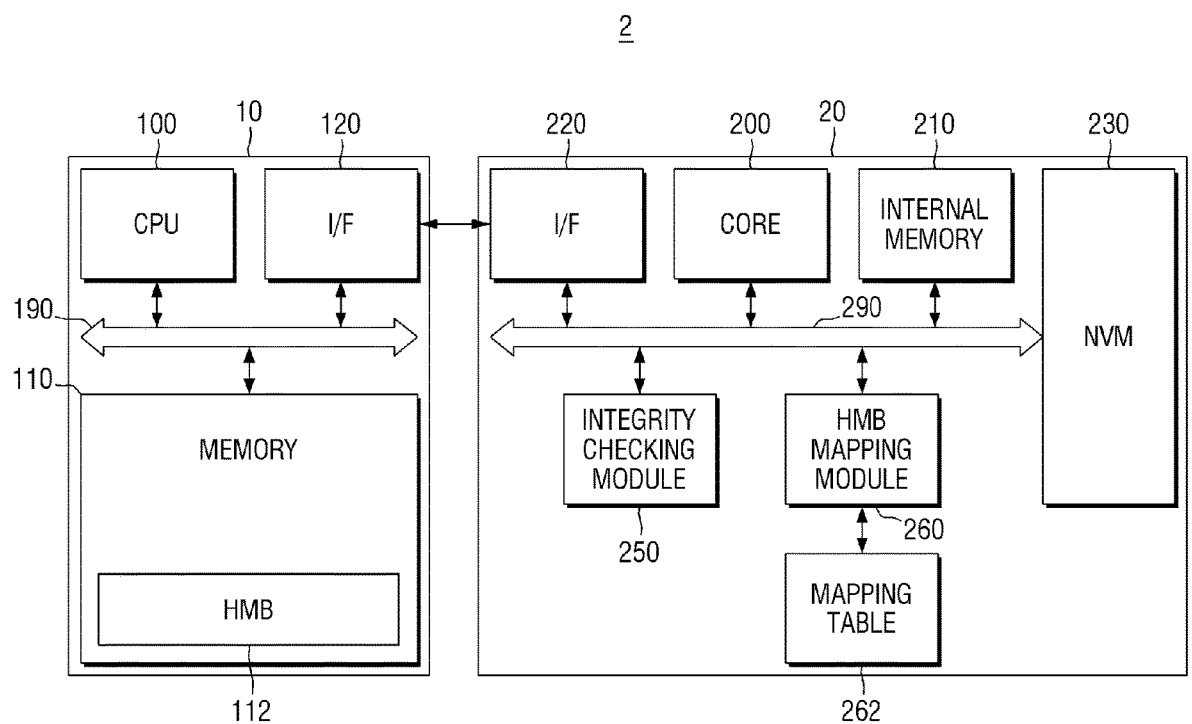
FIG. 10 is a schematic diagram illustrating a storage system according to another embodiment of the present disclosure.

FIG. 10 is a schematic diagram illustrating a storage system according to another embodiment of the present disclosure.

Referring to FIG. 10, a storage system 2 according to another embodiment of the present disclosure is different from the storage system 1 of FIG. 1 in that the former does not include an HMB module 240.

That is, in the embodiment of FIG. 1, although the HMB module 240 of the storage system 1 has executed the basic operations for accessing the HMB 112 of the host 10, such basic operations may be integrally implemented in the HMB mapping module 260.

Thus, in the present embodiment, when data stored in a first HMB address of the HMB 112 is corrupted, the HMB mapping module 260 may execute an operation of mapping the first HMB address to the other address, and furthermore, the HMB module 240 may also execute an operation of reading data from the non-volatile memory 230 and writing the data on the HMB 112 of the host 10 or an operation of reading data from the HMB 112 of the host 10 other than the non-volatile memory 230 and providing the data to the core 200.

Figure 11:
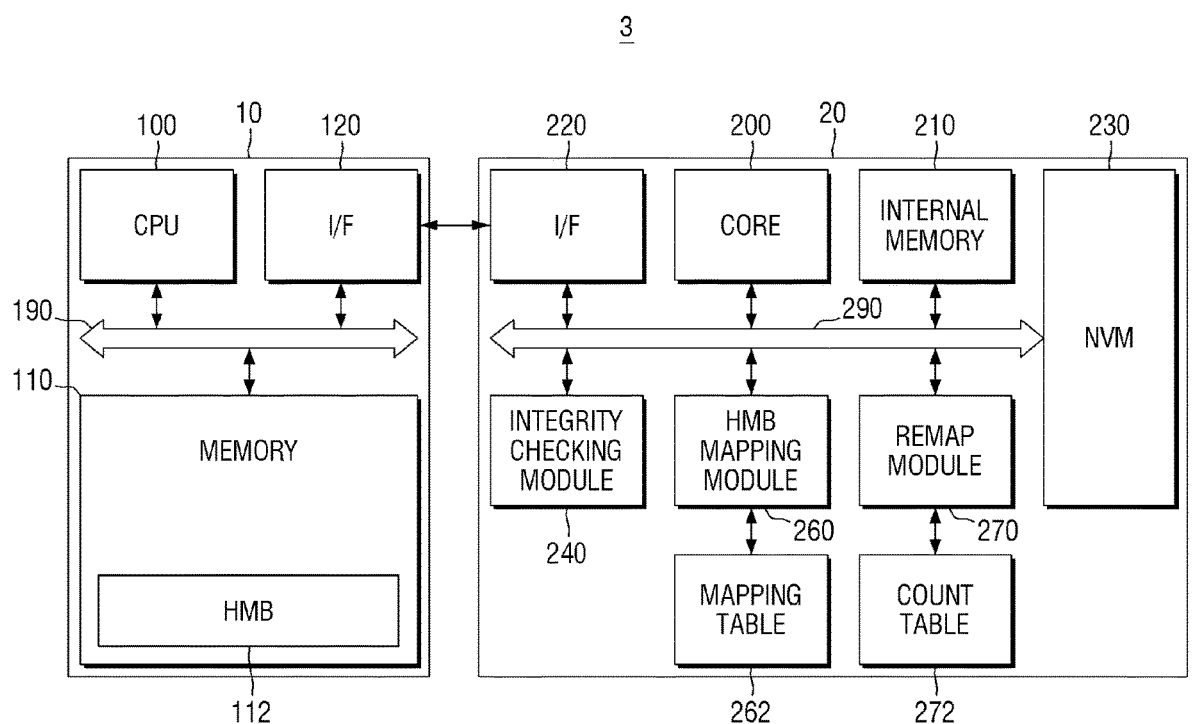
FIG. 11 is a schematic diagram illustrating a storage system according to still another embodiment of the present disclosure.

FIG. 11 is a schematic diagram illustrating a storage system according to still another embodiment of the present disclosure.

Referring to FIG. 11, a storage system 3 according to still another embodiment of the present disclosure is different from the storage system 1 of FIG. 1 in that the former further includes a hardware-error-determination module 270 and a count table 272.

The hardware-error-determination module 270 compares the number of times or the frequency of corruption of the data accessed using the first HMB address with a predetermined threshold value to determine whether to execute the mapping operation described with reference to FIGS. 3 to 6. For example, in FIG. 3, the hardware-error-determination module 270 may determine the first HMB address 0x1000 as having a hardware error if the frequency of the corruption of the data stored in the first HMB address 0x1000 is greater or equal to the predetermined threshold value; in FIG. 4, the hardware-error-determination module 270 may determine the third HMB address 0x3000 as having a hardware error if the frequency of the corruption of the data stored in the third HMB address 0x3000 is greater or equal to the predetermined threshold value. Then, the HMB mapping module 260 may map the first HMB address or the third HMB address to the other address in accordance with the determination of the hardware-error-determination module 270. For example, as shown in FIG. 3, the HMB mapping module 260 may insert an entry of address mapping from 0x1000 corresponding to the first HMB address to 0x5000 corresponding to the other address into the mapping table 262.

Further, the hardware-error-determination module 270 may manage information on the number of times of corruption of the data stored in the first HMB address, using the count table 272. For example, the hardware-error-determination module 270 may manage the count table 272 storing the number of times that the data stored in the first HMB address is determined as corrupted.

Figure 12:
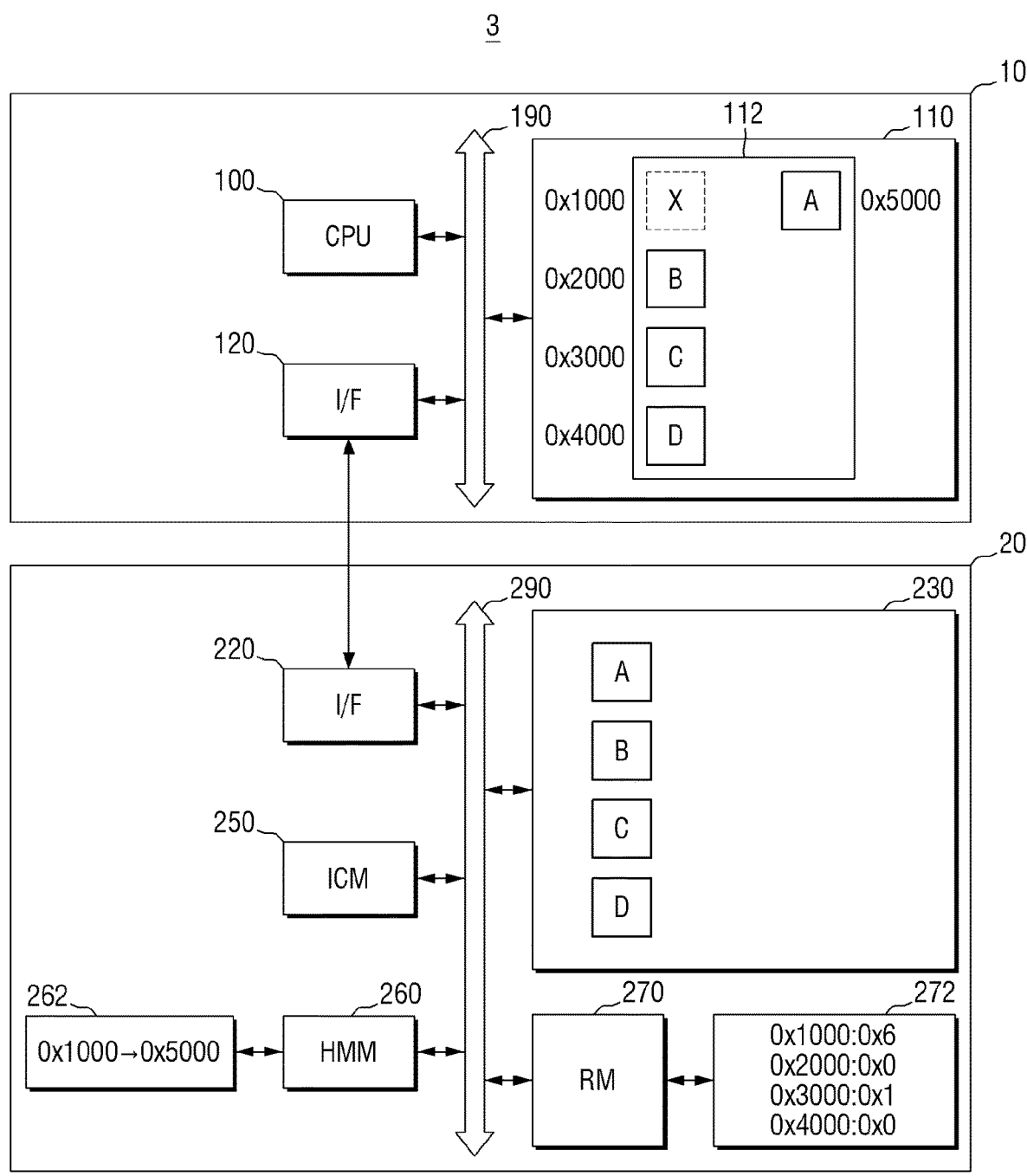
FIG. 12 is a block diagram illustrating the storage system of FIG. 11.

FIG. 12 is a block diagram illustrating the storage system of FIG. 11.

Referring to FIG. 12, when the data (A) is corrupted, the HMB mapping module 260 may record the number of times of occurrence of data corruption of 0x1000 corresponding to the HMB address on the count table 272, on the basis of the checking result of the integrity checking module 250. In this embodiment, the number of times of occurrence of data corruption of 0x1000 is recorded as 6, and the number of times of occurrence of data corruption of 0x3000 is recorded as 1.

If the predetermined threshold value is determined as 5 through the user or the application, the hardware-error-determination module 270 may determine to execute a mapping operation on the grounds that the number of times of occurrence of data corruption exceeds a prescribed threshold value, by comparing 6, which is the number of times of occurrence of data corruption of 0x1000 corresponding to the first HMB address, with the predetermined threshold value 5.

In the case of 0x3000, since the number of times of occurrence of data corruption is merely 1 less than the prescribed threshold value, a mapping operation is not executed.

On the basis of the number of times of occurrence of data corruption at the same location on the HMB 112 in this way, it is possible to predict whether there is a hardware defect on the HMB 112. From this, it is also possible to improve the efficiency of data recovery of the storage device 20 by a method for executing the recovery on the one-time data corruption and the method for executing the mapping operation on the persistent data corruption. In an example embodiment, the hardware-error-determination module 270 may be implemented in software, firmware, hardware, or some suitable combination of at least two of the three.

Figure 13:
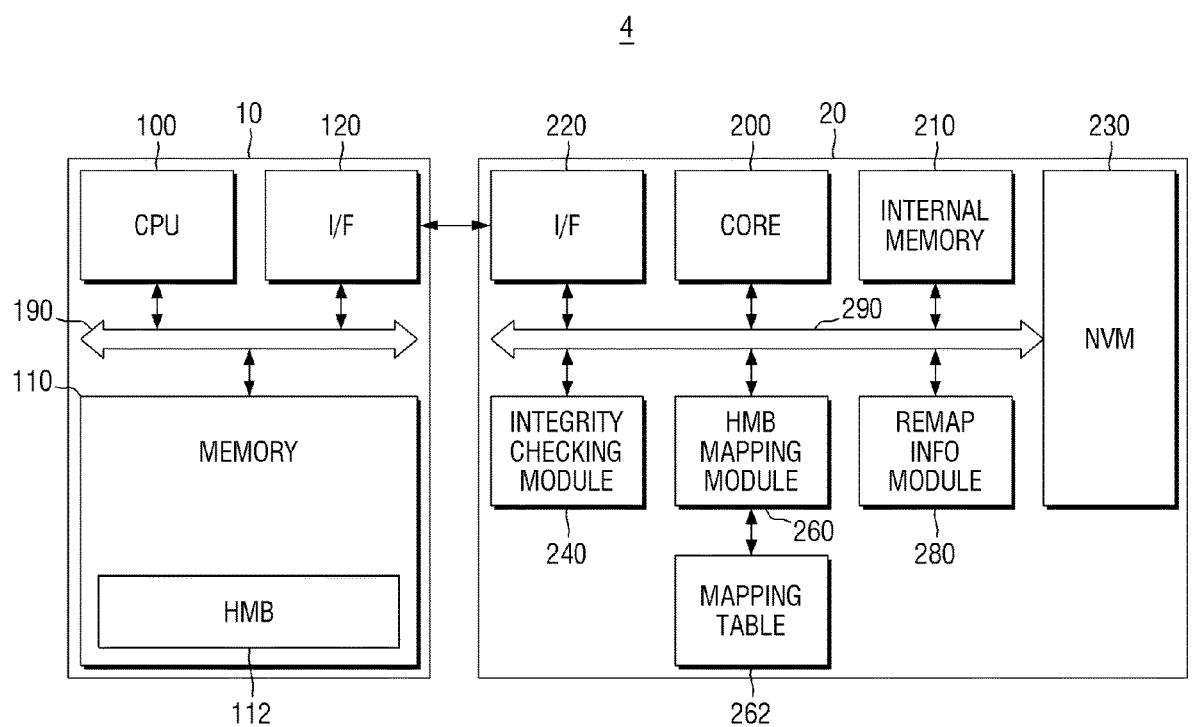
FIG. 13 is a schematic diagram illustrating a storage system according to still another embodiment of the present disclosure.

FIG. 13 is a schematic diagram illustrating a storage system according to still another embodiment of the present disclosure.

Referring to FIG. 13, a storage system 4 according to still another embodiment of the present disclosure is different from the storage system 1 related to FIG. 1 in that the former further includes a hardware-error-information-providing module 280.

The hardware-error-information-providing module 280 may provide information on a mapping operation to the host 10. Information on the mapping operation may include, for example, at least one of information on an HMB address that is determined as having a defect in the HMB 112, information on a mapped address associated with an HMB address with a defect, and information on the number of times that data accessed using the same HMB address is determined as corrupted, but the scope of the present disclosure is not limited thereto. In an example embodiment, the hardware-error-information-providing module 280 may be implemented in software, firmware, hardware, or some suitable combination of at least two of the three.

In concluding the detailed description, those skilled in the art will appreciate that many variations and modifications may be made to the embodiments without substantially departing from the principles of the present disclosure. Therefore, the disclosed preferred embodiments of the disclosure are used in a generic and descriptive sense only and not for purposes of limitation.

What is claimed is:

1. A method of operating a storage device, the method comprising:
   checking integrity of data stored at a first host memory buffer (HMB) address of an HMB in a host coupled to the storage device; and
   mapping the first HMB address to a second address when the data is determined as corrupted as a result of the checking of the integrity of the data.

2. The method for operating the storage device of claim 1, further comprising:
   writing data to the HMB;
   writing checking data for checking integrity of the data to the HMB or the storage device;
   reading the data from the HMB; and
   reading the checking data from the HMB or the storage device,
   wherein the checking of the integrity of the data comprises checking integrity of the data, using the checking data.

3. The method for operating the storage device of claim 1, wherein the second address corresponds to a second HMB address in the HMB different from the first HMB address.

4. The method for operating the storage device of claim 1, wherein the second address corresponds to an internal memory address of an internal memory located inside the storage device.

5. The method for operating the storage device of claim 1, further comprising:
   managing a mapping table storing information on address mapping from the first HMB address to the second address.

6. The method for operating the storage device of claim 5, further comprising:
   storing the mapping table in a non-volatile memory disposed inside the storage device; and
   acquiring information on the address mapping from the mapping table stored in the non-volatile memory, when the storage device is rebooted.

7. The method for operating the storage device of claim 5, further comprising:
   initializing the mapping table storing information on the address mapping.

8. The method for operating the storage device of claim 1, further comprising:
   comparing a number of times that the data accessed using the first HMB address is determined as corrupted, to a predetermined threshold,
   wherein the mapping of the first HMB address to the second address is performed in accordance with a result of the comparing.

9. The method for operating the storage device of claim 8, further comprising:
   managing a count table storing information on the number of times that the data accessed using the first HMB address is determined as corrupted.

10. The method for operating the storage device of claim 1, further comprising:
    providing information on the mapping of the first HMB address to the second address to the host,
    wherein the information on the mapping includes at least one of information on the first HMB address indicating a location determined as having a defect in the HMB, information on the second address, and information on a number of times that the data accessed using the first HMB address is determined as corrupted.

* * * * *